United States Patent Office 3,849,334
Patented Nov. 19, 1974

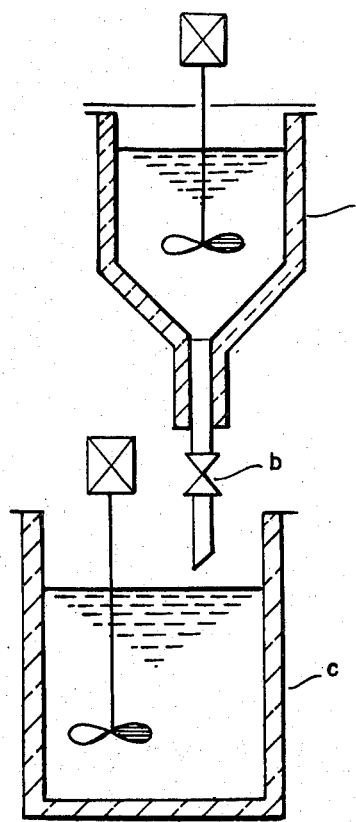

3,849,334
MANUFACTURE OF PARTICULATE CATALYST COMPOSITIONS FOR THE POLYMERIZATION OF OLEFINS
Hans Frielingsdorf, Bad Duerkheim, Heinz Mueller-Tamm, Ludwigshafen, Lothar Hoehr, Buerstadt, and Erich Kolk, Bad Duerkheim, Germany, assignors to Badische Anilin- & Soda-Fabrik Aktiengesellschaft, Ludwigshafen (Rhine), Germany
Filed Dec. 5, 1972, Ser. No. 312,283
Claims priority, application Germany, Dec. 13, 1971, P 21 61 771.0
Int. Cl. B01j 11/84
U.S. Cl. 252—429 B     1 Claim

ABSTRACT OF THE DISCLOSURE

Manufacture of particulate catalyst compositions (K) for the polymerization of olefins, comprising a Ziegler catalyst system (Z) embedded in a wax, wherein an intimate mixture (G) of the Ziegler catalyst system (Z) and the molten wax, which has a melting point above 30° C., is converted to the catalyst composition (K) by comminution of the mixture (G). The method of the invention is characterized in that the intimate mixture (G) is fed at a specific rate to a specific amount of a liquefied inert gas set in motion at a specific Reynolds number, the resulting catalyst composition (K) then being separated from the inert gas. In this way, the catalyst composition (K) may be produced in a technically and economically advantageous manner.

---

The present invention relates to a process for the manufacture of a particulate catalyst composition (K) having a particle diameter of from 0.1 to 5 mm. and suitable for the polymerization of olefins, comprising a Ziegler catalyst system (Z) embedded in a wax, the Ziegler catalyst system consisting of:

(1) $a$ grams of a particulate, inorganic carrier having a particle diameter of from 0.0001 to 2 mm. and containing chemically combined metals, and
(2) from $0.001a$ to $0.1a$ grams [in terms of the transition metal in catalyst component (2.1)] of a Ziegler catalyst applied to said carrier, which Ziegler catalyst consists of:
   (2.1) $b$ gram-moles of a catalyst component consisting of a chloride, oxychloride or alkoxychloride of titanium, zirconium or vanadium, and
   (2.2) from $0.01b$ to $100b$ gram-moles of a catalyst component consisting of a saturated metal alkyl, saturated metal alkoxyalkyl or saturated metal alkylhalide of aluminum, magnesium or zinc or a lithium alkyl, wherein an intimate mixture (G) having a temperature of from 40° to 120° C. and consisting of $c$ grams of the Ziegler catalyst system (Z) and $1c$ to $100c$ grams of a melt of a wax having a melting point above 30° C. is converted to the catalyst composition (K) by comminution of said mixture (G).

Particulate catalyst compositions (K) having a particle diameter of from 0.1 to 5 mm. and suitable for the polymerization of olefins and consisting of a Ziegler catalyst system (Z) embedded in a wax are known to have one or more of the following advantages over catalyst compositions of a comparable nature: they are fairly resistant to environmental influences, for example to moisture, which has a destructive effect on the Ziegler catalyst system (Z); manipulation thereof entails substantially no toxic risks; they are relatively easy to meter; they enable the activation (liberation) of the Ziegler catalyst system (Z) by melting the wax to be thermally controlled with regard to time and place.

A drawback of the above particulate catalyst compositions (K) is that they have hitherto been obtainable only at considerable expense (for example by the fluidized bed coating process which involves a large amount of apparatus and auxiliary media), or by the vaporizing coating process requiring vacuum chambers and cooling plant, or in an unsatisfactory state (e.g. when produced by the spray-coating process where agglomerates of the particles tend to form).

It is an object of the present invention to provide a process of the above type which suffers from the said drawbacks either not at all or to a considerably lesser degree.

We have found that this object is achieved if a specific mixture of the Ziegler catalyst system (Z) and molten wax is fed in a specific manner to liquefied inert gas which has been set in motion in a specific manner.

Thus the present invention relates to a process for the manufacture of a particulate catalyst composition (K) having a particle diameter of from 0.1 to 5 mm. and suitable for the polymerization of olefins, comprising a Ziegler catalyst system (Z) embedded in a wax, the Ziegler catalyst system consisting of:

(1) $a$ grams of a particulate, inorganic carrier having a particle diameter of from 0.0001 to 2 mm. and containing chemically combined metals, and
(2) from $0.001a$ to $0.1a$ grams [in terms of the transition metal in catalyst component (2.1)] of a Ziegler catalyst applied to said carrier, which Ziegler catalyst consists of:
   (2.1) $b$ gram-moles of a catalyst component consisting of a chloride, oxychloride or alkoxychloride of titanium, zirconium or vanadium, and
   (2.2) from $0.01b$ to $100b$ gram-moles of a catalyst component consisting of a saturated metal alkyl, saturated metal alkoxyalkyl or saturated metal alkylhalide of aluminum, magnesium or zinc or a lithium alkyl, wherein an intimate mixture (G) having a temperature of from 40° to 120° C. and consisting of $c$ grams of the Ziegler catalyst system (Z) and $1c$ to $100c$ grams of a melt of a wax having a melting point above 30° C. is converted to the catalyst composition (K) by comminution of said mixture (G). The process of the invention is characterized in that 1 part by weight of said intimate mixture (G) having a temperature of from 40° to 120° C. is passed, at a rate of from 0.0001 to 0.01 and in particular from 0.0008 to 0.003 part by weight per second into from 0.2 to 25 and in particular 2 to 8 parts by volume (parts by weight relate to parts by volume as do kilograms to liters) of a liquefied inert gas having a temperature of from −30° to −200° C. and in particular from −80° to −200° C. and in motion at a Reynolds number of from $3.4 \times 10^3$ to $5 \times 10^4$, whereupon the resulting particulate catalyst composition (K) is separated from the inert gas.

The following remarks refer to the substances contained in Ziegler catalyst system (Z) used in our invention:

(1) Suitable carrier (1) are those conventionally used, e.g. MgO, $Al_2O_3$, $Mg(OH)_2$, $Mg(OH)Cl$, $Mg(OH)Cl_2$, $MgSnO_3$, $Mg_6Al_2O_x(OH)_y(CO_3)_z$, where $$x+y+z=18.$$

Of these, particularly suitable substances are $$Mg_6Al_2O_x(OH)_y(CO_3)_z,$$

where $x+y+z=18$, and $MgSnO_3$.

(2) The actual Ziegler catalyst (2) and the catalyst components (2.1) and (2.2) are also those conventionally used.
   (2.1) Suitable catalyst components of this type are for example $TiCl_4$, $ZrCl_4$, $VCl_4$, 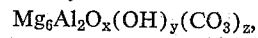

and $TiCl_2(OC_2H_5)_2$. Of these, particularly suitable compounds are $TiCl_4$, $VCl_4$ and $VOCl_3$.

(2.2) Suitable catalyst components of this type are for example $Mg(C_4H_9)_2$, $Al(C_2H_5)_3$, $Al(C_3H_7)_3$, $Al(C_4H_9)_3$, $Al(i-C_4H_9)_3$, $Al(C_8H_{17})_3$, $$Al(C_{12}H_{25})_3,$$

$Al(C_2H_5)_2Cl$, $Al(C_2H_5)_2(OC_2H_5)$, $Zn(C_2H_5)_2$ and $Li(C_4H_9)$. Of these, particularly suitable compounds are $Al(C_2H_5)_3$, $Al(i-C_4H_9)_3$, $Al(C_2H_5)_2Cl$ and $Zn(C_2H_5)_2$.

The application of the Ziegler catalyst (2) to the carrier (1) may be effected in conventional manner. In general, the carrier (1) will be charged with the catalyst component (2.1) and then with catalyst component (2.2).

The wax in which the Ziegler catalyst system (Z) is embedded in our invention must be solid at a temperature of 30° C., i.e. it must have a melting point above 30° C., preferably above 50° C. The chemical nature of the wax is only critical inasmuch as it must not, of course, contain physically or chemically combined substances or groups which act as poisons on the Ziegler catalysts. Such substances or groups are well known, of which water and acids and hydroxyl groups and other groups containing acidic hydrogen are particularly important. Especially suitable waxes for the purposes of the invention are hydrocarbon waxes of natural or synthetic origin. Other waxes are also suitable however, for example polyvinyl ether waxes.

The first step in the manufacture of the catalyst composition (K) is the preparation of an intimate mixture (G) of the Ziegler catalyst system (Z) and the molten wax at a temperature of from 40° to 120° C. and preferably from 80° to 90° C. This may be simply carried out by dispersing the Ziegler catalyst system (Z) uniformly in the molten wax using stirrer-type dispersing equipment.

In the second step, the flowable mixture (G) is introduced under conditions as specified above into a liquefied inert gas (e.g. nitrogen, argon, propane, ethane, but preferably nitrogen). The particle size of the catalyst composition may be influenced as desired by adjusting the mechanical parameters, the rate of introduction of mixture (G) into the liquid inert gas and the state of motion of the liquefied inert gas. Slow rates of introduction and relatively vigorous states of motion give relatively small particle sizes and vice versa. In a practical arrangement, the flowable mixture (G) may be conveniently introduced into the liquefied inert gas from a vessel provided with adjustable discharge means, for example a dripper, the mixture (G) having been placed (or even prepared) in said vessel, which is located immediately above the tank containing the liquefied inert gas. This has the advantage that the process takes place in a protective gas atmosphere provided by the evaporating inert gas (Ziegler catalyst systems are very sensitive). The remaining point to be mentioned in this context relates to the desired state of motion of the liquefied inert gas. This may be achieved in a simple manner, for example by stirring with a greater or lesser degree of vigor.

The final step comprises the separation of the catalyst composition (K) from the inert gas. This may also be carried out in a simple manner, conveniently by allowing or causing the liquid inert gas to vaporize on completion of the introduction of mixture (G).

As mentioned above, the process of the invention produces the desired catalyst composition (K) in a satisfactory state and at no great expense. Furthermore, the catalyst compositions produced by this process have a very narrow distribution of particle sizes and show substantially even distribution of the Ziegler catalyst system (Z) in each particle.

The catalyst composition (K) may be used in conventional manner for the polymerization of olefins, particularly of ethylene and propylene.

EXAMPLE 1

The starting materials used are:

(A) a paraffin wax having a melting point of from 69°–73° C., and
(B) a Ziegler catalyst system (Z) comprising
  (1) $a$ grams of a particulate magnesium oxide having a particle diameter of from 0.004 to 1 mm., as carrier, and
  (2) $0.02a$ grams [in terms of the transition metal in catalyst component (2.1)] of a Ziegler catalyst aplied to said carrier and comprising
    (2.1) $b$ gram-moles of a catalyst component consisting of titanium tetrachloride, and
    (2.2) $10b$ gram-moles of a catalyst component consisting of aluminum triethyl.

The equipment used is illustrated diagrammatically in the accompanying drawing, in which (a) designates a heated stirred vessel for the preparation and storage of the intimate mixture (G) of Ziegler catalyst system (K) and molten wax,
(b) designates an adjustable discharge device or dripper for the mixture (G), and
(c) designates a thermally insulated stirred tank containing liquid inert gas.

52 grams of the Ziegler catalyst system (Z) and 200 grams of the wax are placed in the stirred vessel (a) and an intimate mixture is prepared from these components by heating and slow stirring to provide a flowable mixture having a temperature of 85° C. This mixture is fed to the stirred vessel (c) via the dripper (b) at a rate of 0.85 grams/sec. The stirred tank (c) contains 1.8 l. of liquefied nitrogen having a temperature of −196° C. and moving at a Reynolds number of $3.4\times 10^3$. On completion of the addition of mixture (G) to the nitrogen, the catalyst composition (K) is removed from the nitrogen by allowing the latter to evaporate.

The resulting catalyst composition has the following distribution of particle sizes:

| Particle size (mm.): | Percentage by weight |
|---|---|
| 3 to 2 | 0.1 |
| 2 to 1 | 73.7 |
| 1 to 0.5 | 18.4 |
| 0.5 to 0.35 | 6.4 |
| 0.35 to 0.20 | 1.2 |
| <0.2 | 0.2 |

EXAMPLE 2

The starting materials used are:

(A) a wax mixture containing equal parts of paraffin wax as used in Example 1 and a polyvinyl alkyl ether wax having a melting point of 56° C., and
(B) a Ziegler catalyst system (Z) comprising
  (1) $a$ grams of a particulate magnesium aluminum oxide having a particle diameter of from 0.01 to 0.8 mm., as carrier, and
  (2) $0.05a$ grams [in terms of the transition metal in catalyst component (2.1)] of a Ziegler catalyst applied to said carrier and comprising
    (2.1) $b$ gram-moles of a catalyst component consisting of titanium tetrachloride, and
    (2.2) $10b$ gram-moles of a catalyst component consisting of aluminum diethyl chloride.

The process described in Example 1 is repeated except that the liquefied nitrogen is set in motion at a Reynolds number of $3.4\times 10^4$.

The resulting catalyst composition has the following distribution of particle sizes:

| Particle size (mm.): | Percentage by weight |
|---|---|
| 2 to 1 | 28.1 |
| 1 to 0.5 | 55.6 |
| 0.5 to 0.35 | 13.2 |
| 0.35 to 0.20 | 2.8 |
| <0.2 | 0.3 |

EXAMPLE 3

The starting materials used are:

(A) the wax mixture described in Example 2, and
(B) the Ziegler catalysts system (Z) described in Example 1.

The process described in Example 1 is repeated except that the liquefied nitrogen is replaced by liquid propane having a temperature of $-78°$ C. and set in motion at a Reynolds number of $3.4 \times 10^4$.

The resulting catalyst composition has the following distribution of particle sizes:

| Particle size (mm.): | Percentage by weight |
|---|---|
| >4 | 0.5 |
| 4 to 3 | 0.7 |
| 3 to 2 | 1.0 |
| 2 to 1 | 68.6 |
| 1 to 0.5 | 25.2 |
| 0.5 to 0.35 | 3.1 |
| 0.35 to 0.20 | 0.6 |
| <0.2 | 0.3 |

EXAMPLE 4

The starting materials used are:

(A) the wax mixture described in Example 2, and
(B) the Ziegler catalyst system (Z) described in Example 2.

The process described in Example 1 is repeated except that the mixture (G) consists of 370 grams of Ziegler catalyst system (Z) and 1,400 grams of the wax mixture and the discharge or dripping rate is 2.9 grams per second. The liquid nitrogen is set in motion at a Reynolds number of $3.4 \times 10^4$.

The resulting catalyst composition has the following distribution of particle sizes:

| Particle size (mm.): | Percentage by weight |
|---|---|
| >4 | 0.1 |
| 4 to 3 | 0.1 |
| 3 to 2 | 13.7 |
| 2 to 1 | 70.2 |
| 1 to 0.5 | 13.9 |
| 0.5 to 0.35 | 1.3 |
| 0.35 to 0.20 | 0.5 |
| <0.2 | 0.2 |

We claim:
1. A process for the manufacture of a particulate catalyst composition (K) having a particle diameter of from 0.1 to 5 mm. and suitable for the polymerization of olefins, comprising a Ziegler catalyst system (Z) embedded in a wax, the Ziegler catalyst system consisting of:
   (1) $a$ grams of a particulate, inorganic carrier having a particle diameter of from 0.001 to 2 mm. and containing chemically combined metals, and
   (2) from $0.001a$ to $0.1a$ grams, in terms of the transition metal in catalyst component (2.1), of a Ziegler catalyst applied to said carrier, which Ziegler catalyst consists of:
      (2.1) $b$ gram-moles of a catalyst component consisting of a chloride, oxychloride or alkoxychloride of titanium, zirconium or vanadium, and
      (2.2) from $0.01b$ to $100b$ gram-moles of a catalyst component consisting of a saturated metal alkyl, saturated metal alkoxyalkyl or saturated metal alkylhalide of aluminum, magnesium or zinc or a lithium alkyl, wherein an intimate mixture (G) having a temperature of from 40° to 120° C. and consisting of $c$ grams of the Ziegler catalyst system (Z) and $1c$ to $100c$ grams of a melt of a wax having a melting point above 30° C. is converted to the particulate catalyst composition (K) by comminution of said mixture (G), in which 1 part by weight of said intimate mixture (G) having a temperature of from 40° C. to 120° C. is passed, at a rate of from 0.0001 to 0.01 part by weight per second, into from 0.2 to 25 parts by volume, said parts by weight relating to said parts by volume as do kilograms to liters, of a liquefied inert gas having a temperature of from $-30°$ to $-200°$ C. and in motion at a Reynolds number of from $3.4 \times 10^3$ to $5 \times 10^4$, whereupon the resulting particulate catalyst composition (K) is separated from the inert gas.

References Cited
UNITED STATES PATENTS

| | | | |
|---|---|---|---|
| 2,989,516 | 6/1961 | Schneider | 252—429 B X |
| 3,008,943 | 11/1961 | Guyer | 252—429 B X |
| 3,453,217 | 7/1969 | Kozlowski et al. | 252—430 |
| 3,563,912 | 2/1971 | Young | 252—430 |

PATRICK P. GARVIN, Primary Examiner

U.S. Cl. X.R.

252—431 R; 260—93.7, 94.9 D